Nov. 25, 1969 F. A. SONNENBERG ET AL 3,479,865

SANITARY LIQUID LEVEL MEASUREMENT DEVICE

Filed April 5, 1968 3 Sheets-Sheet 1

INVENTOR.
FREDERIC A. SONNENBERG
GEORGE DE VRIES
BY
Lawrence H. Poston
AGENT

INVENTOR.
FREDERIC A. SONNENBERG
GEORGE DeVRIES
BY
Lawrence H. Peston
AGENT

Nov. 25, 1969  F. A. SONNENBERG ET AL  3,479,865
SANITARY LIQUID LEVEL MEASUREMENT DEVICE
Filed April 5, 1968

INVENTOR.
FREDERIC A. SONNENBERG
GEORGE DeVRIES
BY

AGENT

United States Patent Office 3,479,865
Patented Nov. 25, 1969

3,479,865
SANITARY LIQUID LEVEL MEASUREMENT DEVICE
Frederic A. Sonnenberg, Foxboro, and George DeVries, Westboro, Mass., assignors to The Foxboro Company, Foxboro, Mass., a corporation of Massachusetts
Filed Apr. 5, 1968, Ser. No. 719,184
Int. Cl. G01f 23/00
U.S. Cl. 73—299       1 Claim

ABSTRACT OF THE DISCLOSURE

A liquid level measuring device for milk tanks and the like. A pressure responsive diaphragm unit is mounted near the base of the tank to measure the head of liquid in the tank. A special means is provided for sealing the diaphragm unit in the tank so that crevices are eliminated and sanitary conditions are maintained.

---

This invention relates to the measurement of liquid level by means of liquid head sensing means installed in a liquid container. Of particular concern in this invention is the measurement of liquids requiring sanitary conditions, such as foodstuffs exemplified by milk.

A specific consideration of this invention is the provision of means and method for mounting such pressure sensing means in a liquid tank without crevices interior to said tank which lend themselves to unsanitary deposits from the measured liquid.

This invention provides not only such sanitary mounting means, but enables repeated assembly and disassembly while maintaining the integrity of the desired sanitary condition.

The structure and method of this invention involves the extrusion of a sealing member for mounting crevice situations into a convex seal form interior to the liquid tank.

This invention may be related particularly to the liquid level measurement of milk.

Of all foods none surpasses milk as a single source of important dietary elements. Milk has a potential to serve as a carrier of disease. The incidence of milk borne illness has been sharply reduced in recent years. Many factors have contributed to this desirable result, and sanitary conditions in milk handling have been a real factor. Despite this progress, however, occasional milk borne outbreaks of illness still occur, emphasizing the need for continued vigilance at every stage of milk processing and handling. Problems associated with the sanitary control of milk and milk products have increased in complexity because of new processes, chemicals, materials and marketing patterns.

Accordingly, the advance in the milk handling art as provided by this invention is a matter of importance as a further step toward public health protection.

Pressure sensing devices according to this invention are suitable for measuring the liquid level in open or closed vessels, whether the liquid is corrosive or non-corrosive, slurry, viscous or free-flowing, under vacuum or under substantial static pressures.

The sanitary seal of this invention lends itself to food and dairy product applications and meets high sanitary standards. The seal minimizes, in a readily removable unit, small crevices in which process material might build up and promote bacterial growth which would lead to product contamination.

The method of providing the seal assembly of this invention involves assembly by cam action to distort a seal member by extrusion into a mounting opening to form the desired crevice minimizing convex seal surface.

This invention therefore provides new and improved means and method of measuring the head of liquids.

Other objects and advantages of this invention will be in part apparent and in part pointed out hereinafter and in the accompanying drawings, wherein.

Figure 1:
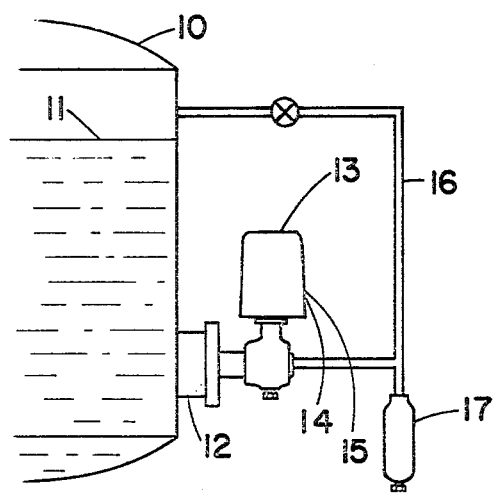
FIGURE 1 is a schematic showing of a liquid level measuring system incorporating this invention.

The FIGURE 1 installation of a liquid level measuring system according to this invention, is one example of several possible types of liquid head installations. FIGURE 1 is a closed tank, dry leg type. The closed tank 10 is filled to a liquid level shown at 11. A pressure sensing assembly 12 is mounted in the tank wall in the lower part of the tank but somewhat above the bottom. Calibration allowance is made for the constant volume of liquid below the sensing assembly 12. The response of the pressure sensing assembly 12 is directed to a transmitter system 13 which is a pneumatic force balance device with pneumatic power input at 14 and signal output at 15. The force balance device is fed a signal on a differential pressure basis, one pressure from the fluid being measured, through the sensing unit 12, and the other pressure through a dry leg connection 16, from within the tank 10, at a point above the liquid level 11. In such dry leg installations a condensate trap 17 is provided at the bottom of the dry leg 16.

Another form of installation may be a closed tank with a wet leg for use when a condensate trap is not desirable or when the process fluid is corrosive. A constant liquid head (wet leg) of liquid suitable to the installation is used on one side of the transmitter with closed tanks under pressure or vacuum. Open tank installations simply vent one side of the transmitter to atmosphere.

Figure 2:
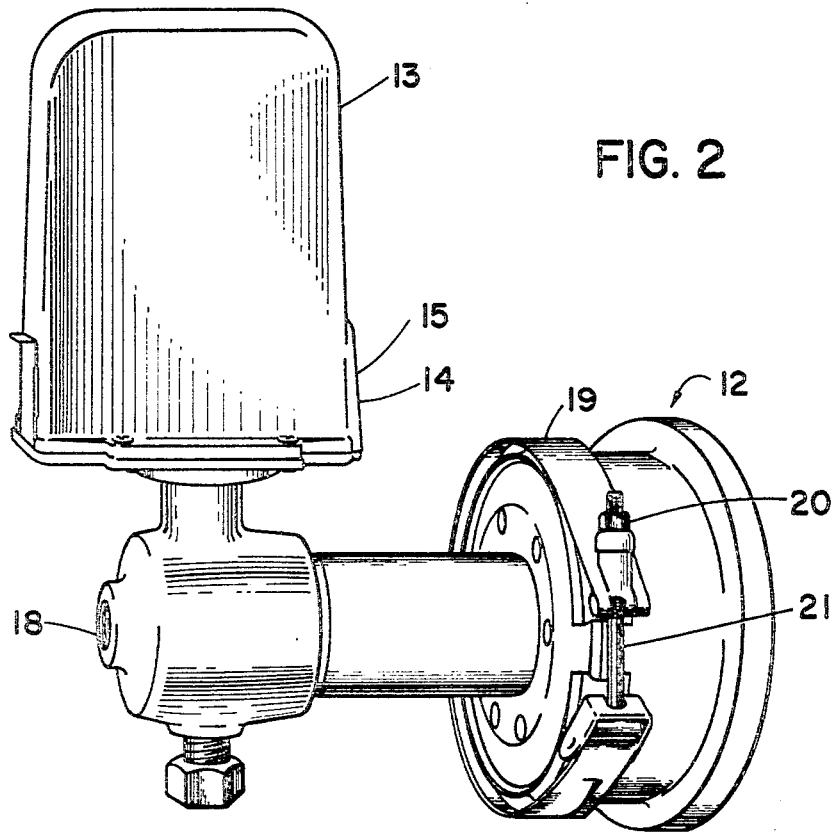
FIGURE 2 is an enlarged perspective of the pressure transmitter of FIGURE 1.

In the FIGURE 2 perspective enlargement of the transmitter system of FIGURE 1, the connection point for the dry leg 16 is shown at 18, and the pressure sensor assembly 12 is shown in more external detail.

Of particular importance in FIGURE 2 is a constricting clamp ring 19, which may be tightened or loosened by adjustment of a nut 20 on a tie bolt 21. As will be seen hereinafter, this clamping action provides cam action resulting in assembly forces and movement axially of the ring 19 centrally horizontally thereof as seen in FIGURE 2. Thus the threading cam action of the nut 20 on the bolt 21 is a secondary cam action on the screw threads, which produces a primary cam action of assembly of the sensor assembly 12.

Figure 3:
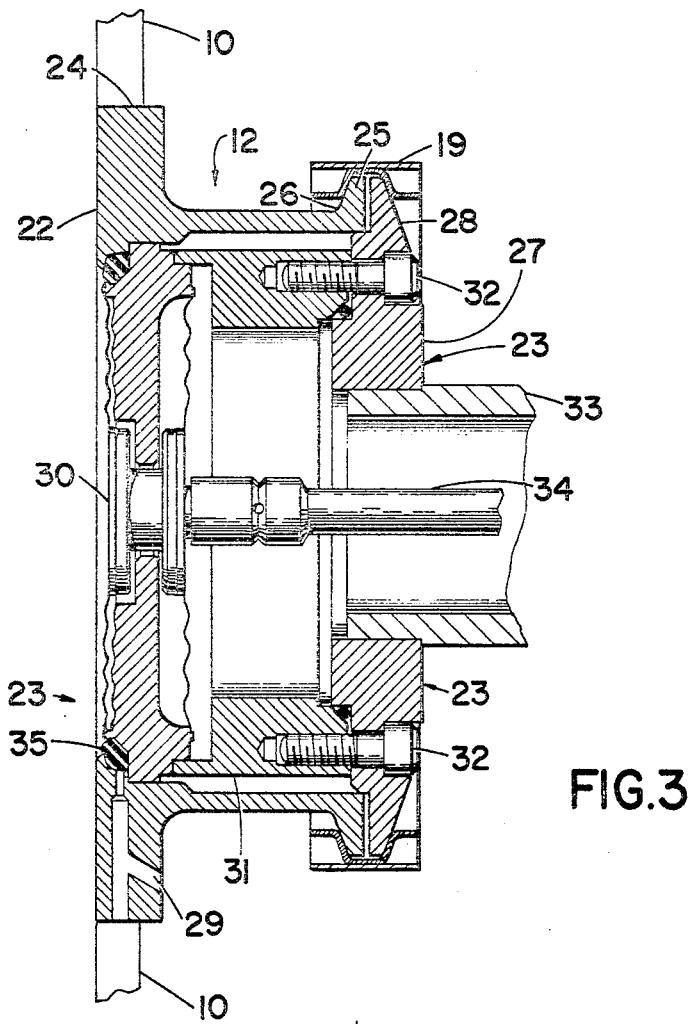
FIGURE 3 is a central section through the pressure sensor unit of the transmitter of FIGURES 1 and 2.

In FIGURE 3, the pressure sensing assembly is shown to comprise a permanent tank mounting spud ring 22; a removable pressure unit 23; and the camming constrictor ring 19.

The spud 22 has a tank mounting flange whose outer periphery 24 is permanently mounted in the wall of the tank 10 with a fully closed mounting interface flush with the inner wall of the tank. On the outer end of the spud 22, there is a ring flange 25 with a tapered cam face 26 on the tank side of the flange 25. The pressure sensor unit 23, at its external end is provided with an end plate 27 with a peripheral cam face 28 operatively associated with the cam face 26 in opposite disposition thereto. The constrictor ring 19 has an inner ring form which is generally shaped as an inverted U, and which contains the peripheries of the spud flange 25 and the end plate 27.

As the ring 19 is increasingly constricted, the sensor unit 23 is forced into assembly within the spud 22. This is accomplished by tightening the (FIGURE 2) nut 20 on the bolt 21. In the spud 22, a drain passage 29 is provided to exit any fluids which may be trapped as the sensor unit 23 and the spud 22 are assembled.

The sensor unit 23 comprises a diaphragm unit 30; a sleeve housing 31 permanently end secured to the diaphragm unit; and the end plate 23 secured to the outer end of the sleeve housing 31 by bolts 32. An exit housing sleeve 33 is mounted in the end plate 23. The diaphragm unit is a standard double diaphragm device, with a central support plate and an axial shaft 34 which extends out through the exit sleeve 33 for movement or force transmission in representation of the liquid head on the diaphragm unit 30 within the tank 10.

Figure 5:
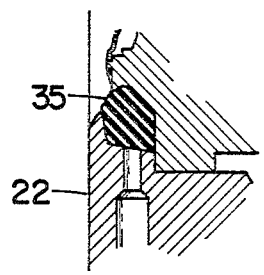
FIGURE 5 is a showing of the FIGURE 4 structure as fully assembled with the seal fully constricted.
Figure 4:
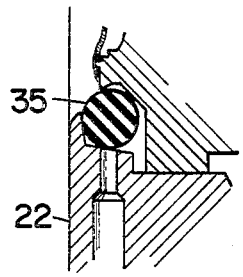
FIGURE 4 is a fragmentary showing of the seal portion of FIGURE 3, prior to full assembly and prior to constriction of the seal.

The detail of the tank facing seal around the pressure sensor unit 23 with respect to the inner periphery of the spud ring 22 is shown in FIGURES 4 and 5.

In FIGURE 4 an O ring 35, in its undistorted form is shown held between flange shoulders on the spud ring 22 and the sensor unit. As the sensor unit is forced into assembly with the spud 22, the O ring is distorted to fill the space between the flange shoulders and is partially extruded therebetween to form a convex ring facing into the tank and preventing any crevice form between the sensor unit and the spud.

For receiving the O ring prior to final assembly, the sensor unit 23 is formed with an outer periphery overhang flange, defining a ring recess into which an oversize O ring is mounted (FIGURE 4). The spud 22 is formed with an inner periphery overhang flange defining a ring recess cooperating with the sensor unit ring recess to form an annular slot receiving the O ring but not fully containing it in the full assembly situation (FIGURE 5). A wall of the spud ring recess is at an angle such as to define a truncated cone. The O ring is forced into increasing constriction as the assembly of the sensor unit and the spud ring progresses. Finally, as in FIGURE 5, the cooperating ring recesses are entirely filled, and the O ring is tended toward extrusion into the tank area sufficiently to convexly fill the gap between the sensor unit and the spud in a crevice minimizing form.

The particular angles, flat surfaces and form of the cooperating ring recesses which contain the O ring are established to lend themselves to the camming and constricting assembly in which the oversized O ring is tended to extrusion sufficiently to provide the desired minimized crevice form of joining between the sensor unit and the spud member as exposed to the interior of the tank. The integrity of the sanitary condition is maintained throughout repeated assemblies and disassemblies, preferably using a new O ring of each reassembly. Cleaning and sanitizing the tank without removing the sensor unit is also a practical matter with this structure, due to minimal crevice form in the device. A fixed structure thus without crevices can be built, but one which lends itself to ready assembly and disassembly is much more desirable and difficult. This invention provides such a device and the method of assembling this device.

Figure 6:
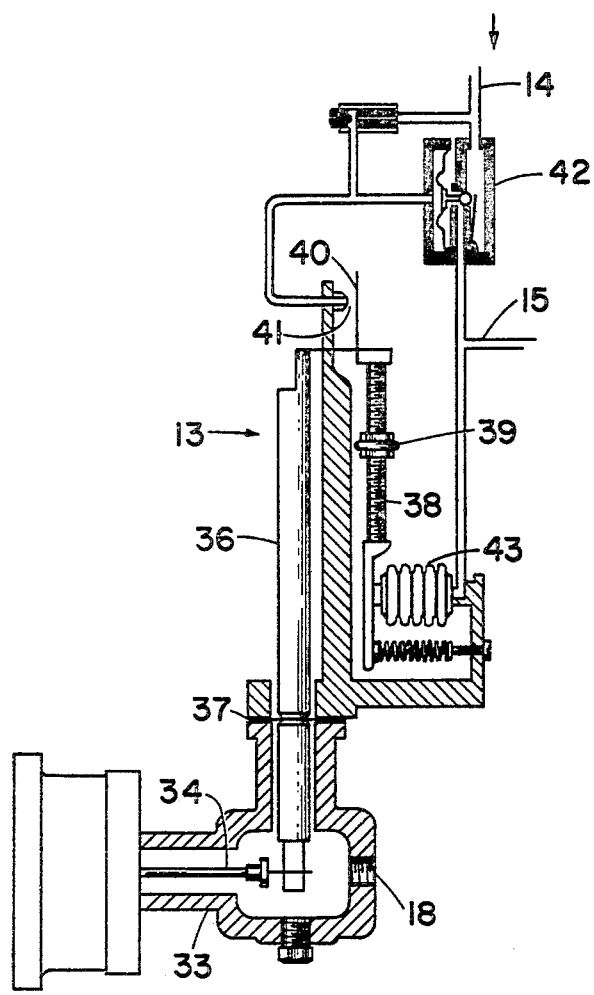
FIGURE 6 is a functional schematic of the pressure transmitter system of FIGURES 1 and 2.

In the FIGURE 6 illustration, the inner works of the transmitter 13 of FIGURES 1 and 2 is shown as a standard pneumatic force balance system operated by the end forces applied to the sensor output shaft 34. This exerts a force on the lower end of a force bar lever 36 with a metal disc 37 thereon acting as a fulcrum and a seal. This force is transmitted by the force bar to a second lever, a range rod 38, of which a span-change range wheel 39 is the fulcrum. A change in force on the lever system moves a flapper 40 in relation to an air nozzle 41. This produces a change in output pressure through a pneumatic relay 42, which is applied to a feedback bellows 43, until the force of this bellows balances the input force to the system. The result is a pneumatic output signal that is proportional to the liquid head being measured.

Other forms of transmitters may be used, as desired, for example, i.e. an electronic transmitter.

As many embodiments may be made of the above invention, and as changes may be made in the embodiment set forth without departing from the scope of the invention, it is to be understood that all matter hereinbefore set forth and in the accompanying drawings is to be interpreted as illustrative only, and not in a limiting sense.

We claim:

1. In a system for measurement of liquids in a highly sanitary fashion, such as volume measurement of milk in a liquid level device wherein the liquid level and therefore the liquid volume in a tank is measured in terms of the liquid head on a pressure sensor, means forming an opening in the wall of the tank for receiving the pressure sensor assembly and providing an annular inwardly directed lip at the innermost portion of the opening and an annular tapered surface immediately adjacent the lip tapering from a minimum diameter adjacent the lip to a greater diameter remote from the lip, the pressure sensor being provided with an outwardly extending lip at its innermost extremity of less diameter than the inwardly directed lip, the pressure sensor being provided with an annular tapering surface adjacent the lip having a minimum diameter adjacent the lip, said lips and said tapered surfaces forming a cavity for retaining an annular sealing means, the annular cavity being smaller than the sealing means so that the sealing means is compressed and extrudes between said lips to form a continuous cavity free surface.

References Cited

UNITED STATES PATENTS

| | | | |
|---|---|---|---|
| 2,756,017 | 6/1956 | Silverman | 277—170 X |
| 2,795,348 | 5/1956 | Kunik | 220—46 X |
| 2,964,030 | 12/1960 | Werner | 277—170 X |
| 3,153,935 | 10/1964 | Karlson | 73—406 X |
| 3,229,527 | 1/1966 | Johnson | 73—422 |

FOREIGN PATENTS 280,275 11/1927 Great Britain.

H. CLEMENT SWISHER, Primary Examiner

U.S. Cl. X.R.

277—171